US010684770B2

(12) United States Patent
Bender et al.

(10) Patent No.: US 10,684,770 B2
(45) Date of Patent: *Jun. 16, 2020

(54) MONITORING AN ACTIVITY AND DETERMINING THE TYPE OF ACTOR PERFORMING THE ACTIVITY

(71) Applicant: International Business Machines Corporation, Armonk, NY (US)

(72) Inventors: Michael Bender, Rye Brook, NY (US); Timothy J. Hahn, Cary, NC (US); Leucir Marin Junior, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,889

(22) Filed: Apr. 10, 2019

(65) Prior Publication Data

US 2019/0235725 A1 Aug. 1, 2019

Related U.S. Application Data

(63) Continuation of application No. 15/427,365, filed on Feb. 8, 2017, now Pat. No. 10,338,802.

(51) Int. Cl.
*G06F 3/01* (2006.01)
*G01P 13/00* (2006.01)
(Continued)

(52) U.S. Cl.
CPC ........ *G06F 3/0488* (2013.01); *G06F 11/3003* (2013.01); *G06F 11/3409* (2013.01); *G06F 11/3452* (2013.01)

(58) Field of Classification Search
CPC .................. G06F 3/0488; G06F 11/3003
See application file for complete search history.

(56) References Cited

U.S. PATENT DOCUMENTS 8,494,854 B2    7/2013  Gross
9,189,897 B1 *  11/2015 Stenneth ............... G07C 5/008
(Continued)

FOREIGN PATENT DOCUMENTS

WO    2013/181226 A2    12/2013

OTHER PUBLICATIONS

Park et al, "Comparing machine and human ability to detect phishing emails", 2014 IEEE International Conference on Systems Man, and Cybernetics, Oct. 2014, pp. 2322-2327.
(Continued)

*Primary Examiner* — Mohammad K Islam
(74) *Attorney, Agent, or Firm* — Reza Sarbakhsh; Edell, Shapiro & Finnan, LLC

(57) ABSTRACT

Determining a type of actor performing an activity includes monitoring the performance of the activity via at least one sensor to produce activity readings over a dimension. The activity readings are then compared to reference readings that are generated based on a machine performing same activity. The comparison of the reference readings to the activity readings is used to determine a variance between the activity readings and reference readings. Once the variance is determined, the variance is compared with a threshold value to determine the type of actor performing the activity.

18 Claims, 5 Drawing Sheets

(51) Int. Cl.
*G01C 21/28* (2006.01)
*G06F 3/0488* (2013.01)
*G06F 11/30* (2006.01)
*G06F 11/34* (2006.01)

(56) References Cited

U.S. PATENT DOCUMENTS

| | | | |
|---|---|---|---|
| 9,225,531 B2 | 12/2015 | Hachey | |
| 9,258,302 B2 | 2/2016 | Fu et al. | |
| 9,288,298 B2* | 3/2016 | Choudhary | G06F 16/24578 |
| 9,298,912 B2 | 3/2016 | Costigan et al. | |
| 9,582,080 B1* | 2/2017 | Tilton | G06F 3/017 |
| 9,684,627 B1* | 6/2017 | Sar | G06Q 10/0631 |
| 9,743,239 B1* | 8/2017 | Mishra | H04W 4/023 |
| 9,783,162 B2* | 10/2017 | Hoyos | H05K 999/99 |
| 2001/0029319 A1 | 10/2001 | Kazlausky et al. | |
| 2002/0091473 A1* | 7/2002 | Gardner | G07C 5/0808 |
| | | | 701/32.7 |
| 2008/0320500 A1 | 12/2008 | Li et al. | |
| 2009/0122144 A1 | 5/2009 | Latham et al. | |
| 2009/0158430 A1* | 6/2009 | Borders | G06F 21/552 |
| | | | 726/23 |
| 2009/0228318 A1* | 9/2009 | Ara | G06Q 10/06 |
| | | | 705/7.42 |
| 2012/0137367 A1* | 5/2012 | Dupont | G06F 21/00 |
| | | | 726/25 |
| 2013/0268255 A1* | 10/2013 | Harrison | G06F 17/5009 |
| | | | 703/6 |
| 2015/0119728 A1* | 4/2015 | Blackadar | A61B 5/7264 |
| | | | 600/484 |
| 2015/0338917 A1* | 11/2015 | Steiner | H04L 9/3231 |
| | | | 345/156 |
| 2016/0023663 A1* | 1/2016 | Kajiwara | B60R 16/0231 |
| | | | 701/36 |
| 2016/0217387 A1* | 7/2016 | Okanohara | G06N 20/00 |
| 2016/0217388 A1* | 7/2016 | Okanohara | G06N 20/00 |
| 2016/0267335 A1* | 9/2016 | Hampiholi | G06F 3/013 |
| 2016/0378112 A1* | 12/2016 | Ljubuncic | B60W 30/16 |
| | | | 701/45 |
| 2017/0011261 A1* | 1/2017 | Singh | G06K 9/00832 |
| 2017/0021282 A1* | 1/2017 | Comploi | A63G 25/00 |
| 2017/0124480 A1* | 5/2017 | Sarkar | G06N 7/005 |
| 2017/0274908 A1* | 9/2017 | Huai | G05D 1/0214 |
| 2017/0282374 A1* | 10/2017 | Matula | B25J 11/008 |
| 2018/0001901 A1* | 1/2018 | Durney | B60W 50/10 |
| 2018/0093676 A1* | 4/2018 | Emura | G06K 9/00288 |
| 2018/0107216 A1* | 4/2018 | Beaurepaire | B60W 50/08 |
| 2018/0143635 A1* | 5/2018 | Zijderveld | B60W 40/08 |
| 2018/0183819 A1* | 6/2018 | Le | H04L 63/1416 |
| 2018/0224943 A1 | 8/2018 | Bender et al. | |
| 2018/0310161 A1* | 10/2018 | Folske | H04W 8/005 |

OTHER PUBLICATIONS

List of IBM Patents or Patent Applications Treated as Related, filed Apr. 11, 2019.

* cited by examiner

MONITORING AN ACTIVITY AND DETERMINING THE TYPE OF ACTOR PERFORMING THE ACTIVITY

BACKGROUND

1. Technical Field

Present invention embodiments relate to the monitoring and analyzation of an entity performing an activity, and more specifically, determining whether the entity performing the activity is receiving inputs from an organism or a machine.

2. Discussion of the Related Art

As the Internet of Things (IoT) expands to include all sorts of devices, such as kitchen appliances, fitness trackers, alarm clocks, thermostats, vehicles, etc., an immense amount of data is being collected and exchanged. The IoT allows these devices to be sensed and/or controlled remotely across existing network infrastructure, creating opportunities for more direct integration of the physical world into computer-based systems, and resulting in improved efficiency, accuracy, and economic benefit. Because these devices have network connectivity, these devices may be controlled by either a machine or by a human, thereby raising security and safety issues.

Further, devices are becoming more automated and mainstream in the everyday lives of people. However, humans may not be entirely comfortable with the use of automated devices.

SUMMARY

According to one embodiment of the present invention, determining a type of actor performing an activity includes monitoring the performance of the activity, via a sensor, to produce activity readings over a dimension. Furthermore, the activity readings are compared to reference readings that are generated based on a machine performing the same activity to determine a variance between the activity readings and the reference readings. Finally, the type of actor performing the activity is determined based on a comparison of the variance value with a threshold value. Embodiments of the present invention further include an apparatus and computer program product for determining a type of actor performing an activity in substantially the same manner described above.

Present invention embodiments determine whether an actor performing an activity is a machine or an organism (e.g., a human) based on the behavior or performance of the activity by an entity. The present invention embodiments also enable a machine actor to perform an activity in a manner or behavior that simulates the performance or behavior of a human performing the activity.

Present invention embodiments may further include various other aspects. For example, the activity performed includes at least one of operating a vehicle, operating a computer system to access data, and operating an interface to access a device. In addition, present invention embodiments, in determining the variance, includes analyzing the activity and reference reading to define patterns. Present invention embodiments further include producing a confidence level for the determined type of actor.

Moreover, present invention embodiments may include adding randomized elements to the reference readings based on a probability distribution to produce simulated readings of the activity performed by an organism. Additionally, the dimension over which the performance of the activity is monitored includes one of time, a distance, and/or a path.

BRIEF DESCRIPTION OF THE DRAWINGS

Generally, like reference numerals in the various figures are utilized to designate like components.

DETAILED DESCRIPTION

Presented herein are techniques for determining the type of actor performing an activity. Generally, the techniques provided herein utilize sensors or sensor devices to monitor the performance and behavior of a device or system. The sensors may measure various performance characteristics over various dimensions. Once the sensors collect data of the monitored device or system, a reference reading is calculated based on a machine performing the same activity as the monitored device. The present invention embodiment then compares the measured activity readings to the calculated reference readings and calculates a variance, if any, between the measured activity readings and the calculated reference readings. Once the variance is calculated, the variance is compared to a predetermined threshold value or calculated threshold value to determine the type of actor performing an activity. When the calculated variance exceeds the threshold value, the present invention embodiment may determine that the actor performing the activity is a human. Conversely, when the calculated variance does not exceed the threshold value, the present invention embodiment may determine that the actor performing the activity is a machine.

The techniques presented herein may also be utilized to cause an automated device or system to simulate being operated by a human. Generally, the present invention embodiment creates a calculated expected machine based behavior for the performance of an activity. The present invention embodiment then modifies the calculated expected machine based behavior by imparting noise or random elements to create a modified machine based behavior. The present invention embodiment imparts enough noise or random elements that the modified machine based behavior has a variance, when compared to the calculated expected machine based behavior, that exceeds the threshold value, and thus simulates human based behavior for the activity.

These techniques create an additional layer of security and safety for devices and systems, especially with enhanced connectivity (i.e., the Internet of Things). Moreover, the techniques provided herein also provide the ability to make devices act more like humans to make humans more comfortable when interacting with the automated devices, especially those that may invoke fear among humans.

Figure 1:
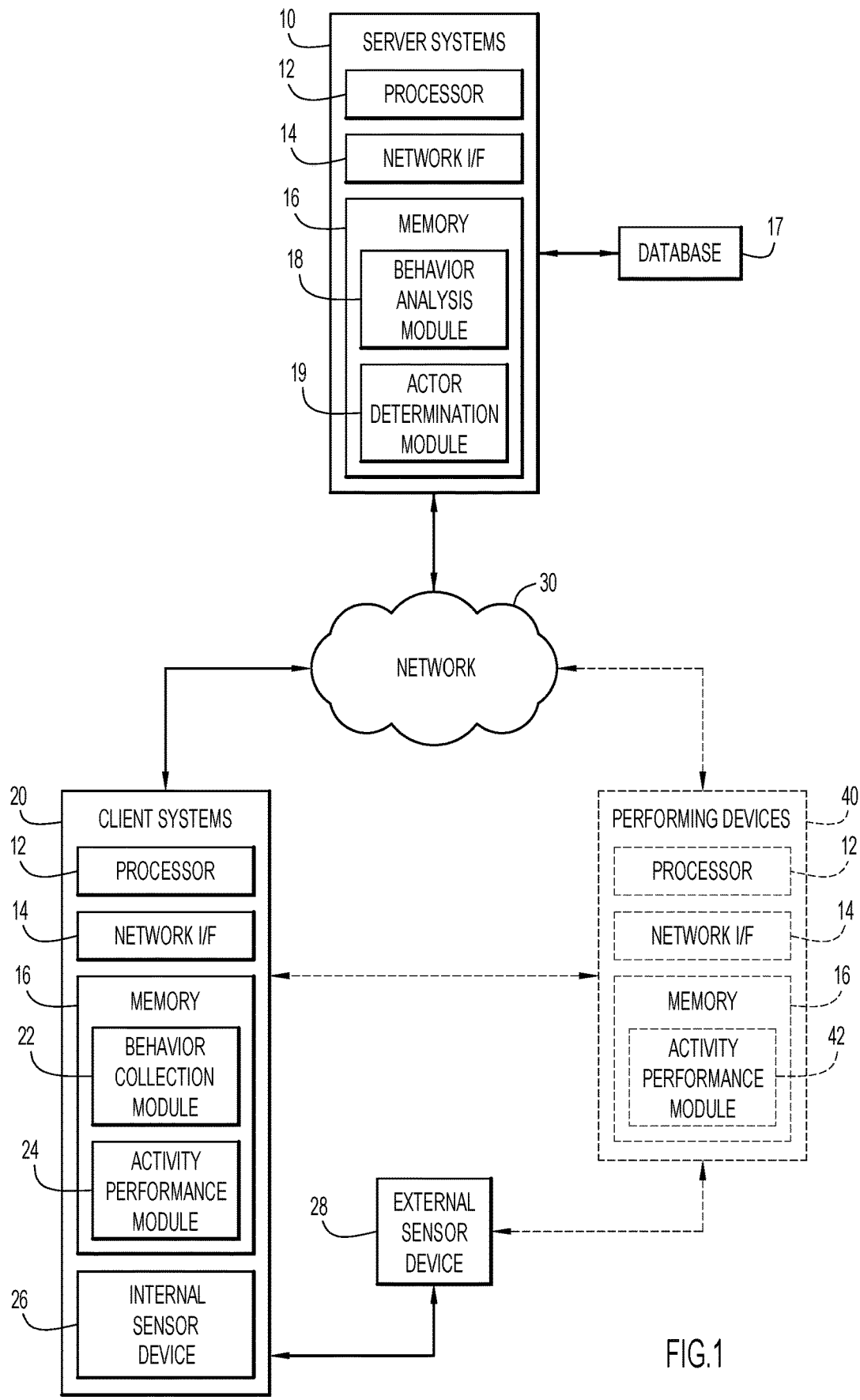
FIG. 1 illustrates an example environment in which the present general inventive concept can be embodied.

An example computing environment for use with present invention embodiments is illustrated in FIG. 1. Specifically, the computing environment includes one or more server systems 10, and one or more client systems 20. Server systems 10 and client systems 20 may be remote from each other and communicate over a network 30. The network may be implemented by any number of any suitable communications media (e.g., wide area network (WAN), local area network (LAN), Internet, Intranet, etc.). Alternatively, server systems 10 and client systems 20 may be local to each other, and communicate via any appropriate local communication medium (e.g., local area network (LAN), hardware, wireless link, Intranet, etc.). By way of example only, the computing environment may implement an internet of things (IoT) type environment.

Server systems 10 may be implemented by any conventional or other computer systems preferably equipped with a display or monitor, a base (e.g., including at least one CPU or processor 12, one or more memories 16 and/or internal or external network interfaces or communications devices 14 (e.g., modem, network cards, etc.)), optional input devices (e.g., a keyboard, mouse or other input device), and any commercially available and custom software (e.g., server/communications software, behavior analysis module 18, actor determination module 19, etc.).

Client systems 20 may be preferably equipped with at least one CPU or processor 12, one or more memories 16, internal or external network interfaces or communications devices 14 (e.g., transceiver, network cards, etc.)), and/or optional input or output devices (e.g., a keyboard, mouse or other input device, a display, etc.). The client systems 20 may further include any commercially available or custom software and/or hardware modules for the particular device to perform device operations (e.g., applications, browser, communications software, behavior collection module 22, activity performance module 24, etc.). Client systems 20 may communicate with server systems 10 for determining a type of actor performing an activity, as described below.

As further illustrated, client systems 20 may include any suitable sensor devices that may sense, collect, and/or provide data (e.g., a sensor (e.g., utility, medical, physiological, weather, alarm, external conditions, device internal conditions, meter, etc.), a device containing a sensor or otherwise collecting data, measurements, and/or readings (e.g., desktop or portable computer system, portable processing device, cellular telephone, appliance, vehicle, medical device, meters, exercise machine or device, etc.), etc.). The suitable sensor devices may be internal sensor devices 26 or external sensor devices 28. The external sensor devices 28 may communicate with the client systems 20 via any appropriate communication medium (e.g., local area network (LAN), wide area network (WAN), Internet, hardware, wireless link, Intranet, etc.). This data may be stored internally on the client systems 20 and/or shared across network 30. The internal sensor devices 26 and the external sensor devices 28 may be configured to collect any type of data, including, but not limited to, location, velocity, temperature, altitude, etc.

Client systems 20 may alternatively include, or be coupled to, one or more performing devices 40 (e.g., vehicle, mobile device, server system, etc.), so that the client systems 20 may monitor the performing devices 40 as the performing devices 40 perform an activity. The performing devices 40 may similarly be preferably equipped with at least one CPU or processor 12, one or more memories 16, internal or external network interfaces or communications devices 14 (e.g., transceiver, network cards, etc.)), and/or optional input or output devices (e.g., a keyboard, mouse or other input device, a display, etc.). The performing devices 40 may further include any commercially available and custom software and/or hardware modules to perform device operations and activities (e.g., applications, communications software, activity performance module 42, etc.).

The client systems 20 include a behavior collection module 22 and an activity performance module 24. Behavior collection module 22 utilizes the internal sensor devices 26 and the external sensor devices 28 to monitor and collect data of the client systems 20 and/or the performance devices 40. The behavior collection module 22 further enables the client systems 20 to send the collected behavior data to the server systems 10 via the network 30. Activity performance module 24 enables the client systems 20 to perform a desired activity in which the outcome is known to the server systems 10. For example, if one or more client systems 20 are in the form of a client or end-user computer system used to access data through a security system by entering a password via the client systems 20, the activity performance module 24 enables a user to enter the required password to access the data protected by the security system. In another example, if the one or more client systems 20 are integrated into a vehicle, the activity performance module 24 enables a user (e.g., local or remote) to enter control parameters (e.g., velocity, positioning, etc.) of the vehicle via various vehicle input control systems (e.g., drive by wire, throttle by wire, brake by wire, shift by wire, steer by wire, etc.) of the vehicle or via a device linked to the vehicle systems (e.g., mobile device, computer system, etc.).

The performing devices 40 also include an activity performance module 42. Similar to the client systems 20, the activity performance module 42 enables the performing devices 40 to perform a desired activity in which the outcome is known to the server systems 10. For example, if the one or more performing devices 40 are a vehicle or are integrated into a vehicle, the activity performance module 42 enables a user (e.g., local or remote) to enter control parameters (e.g., velocity, positioning, etc.) of the vehicle via various vehicle input control systems (e.g., drive by wire, throttle by wire, brake by wire, shift by wire, steer by wire, etc.) of the vehicle or via a device linked to the vehicle systems (e.g., mobile device, computer system, etc.).

The client systems 20 may enable the monitoring of the performance of an activity by either the client systems 20 or the performing device 40 via the internal sensor devices 26 or external sensor device 28. The client systems 20 may further enable a user to communicate with one or more server systems 10 to provide the data collected from the sensor devices 26, 28 and receive actor determination results with regard to the collected data. For example, one or more client systems 20 may be in the form of a client or end-user computer system that may be used to access data through a security system by entering a password via the client systems 20. The internal sensor device 26 may detect the speed in which a password is entered via the client systems 20. The detected speed data may be sent to the server systems 10 for the server system 10 to make a determination as to whether or not the attempted access of the data was machine generated or human generated. In another example, one or more client systems 20 may be in the form of a vehicle traveling along a road, and the performing device 40 may be another vehicle in proximity to the client systems 20 that is also traveling along the same road. The client systems 20 may monitor the performing device 40 via the external sensor devices 28, where the client systems 20 may collect data relating to the speed of the performing device 40 and the positioning of the performing device 40 within a lane. The detected speed data and lane positioning data may be sent to the server systems 10 for the server systems 10 to make a determination as to whether or not the performing device 40 is being controlled by a machine (i.e., a self-driving car) or a human.

The server systems 10 include a behavior analysis module 18 and an actor determination module 19. As further detailed below, behavior analysis module 18 enables the server systems 10 to compare the data received from the client systems 20 via the network 30 with a machine expected performance of the same or similar activity. A database system 17 may store various types of data (e.g., machine generated paths, machine generated velocities, machine generated distances, etc.) for the behavior analysis of the collected data for designated activities. The database system 17 may be implemented by any conventional or other database or storage unit, may be local to or remote from server systems 10, and may communicate via any appropriate communication medium (e.g., local area network (LAN), wide area network (WAN), Internet, hardwire, wireless link, Intranet, etc.). The behavior analysis module 18 may calculate, from data stored in the database 17, the expected performance of a machine for a specific activity, and then may compare the data acquired from the client systems 20 to the calculated expected performance of the machine to determine a variance. The actor determination module 19 enables the server systems 10 to determine, based on the calculated variance from the behavior analysis module 18, whether or not the actor performing the detected activity is an organism (e.g., human) or a machine.

Behavior analysis module 18, actor determination module 19, behavior collection module 22, and activity performance modules 24, 42 may include one or more modules or units to perform the various functions of present invention embodiments described below. The various modules (e.g., behavior analysis module 18, actor determination module 19, behavior collection module 22, and activity performance modules 24, 42, etc.) may be implemented by any combination of any quantity of software and/or hardware modules or units, and may reside within memory 16 of the server systems 10, client systems 20, and performing devices 40 for execution by a corresponding processor 12.

Figure 2:
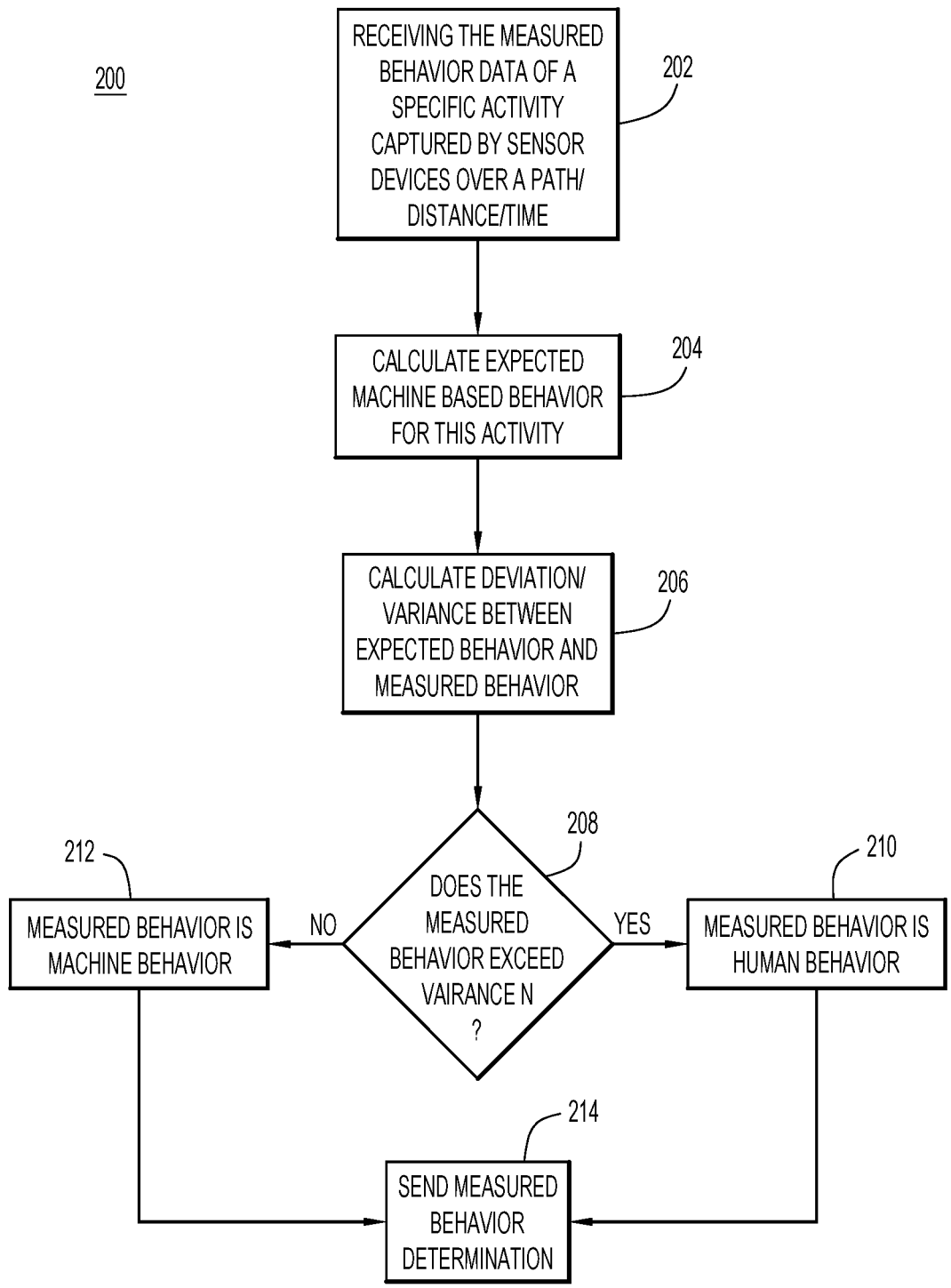
FIG. 2 is a procedural flowchart of determining the actor performing an activity based on the behavior of an entity, according to one present invention embodiment.

With reference now to FIG. 2, procedural flow chart 200 depicts operations (e.g., of behavior analysis module 18 and actor determination module 19) for determining the type of actor performing an activity. Initially, at step 202, the server systems 10 receive the measured behavior data from the client systems 20 via the network 30. The measured behavior data is collected by the internal sensor devices 26 and/or external sensor devices 28. The internal sensor devices 26 and/or external sensor devices 28 of the client systems 20 may be utilized by the client systems 20 to measure the performance of an activity by the client systems 20 via the activity performance module 24 and/or the performing devices 40 via the activity performance module 42. For example, in some present invention embodiments the client systems 20 may perform the activity measured by the sensor devices 26, 28, where in other present invention embodiments, the performing devices 40 may perform the activity measured by the sensor devices 26, 28. In even other present invention embodiments, the client systems 20 and the performing devices 40 may simultaneously perform the activities measured by the sensor devices 26, 28.

The data measured by the internal sensor devices 26 and the external sensor devices 28 may be measured over a known path, a set distance, or a set time period. In one present invention embodiment, when the internal sensor devices 26 and the external sensor devices 28 are detecting the client systems 20 and the performing devices 40 traveling along a support surface (i.e., as vehicles), the sensor devices 26, 28 are configured to track the path over which the client systems 20 and the performing devices 40 travel along a known path (i.e., tracking the path a vehicle takes along the lane of a road). In this present invention embodiment, the data set of the path may be a combination of positioning data points. In another present invention embodiment, internal sensor devices 26 and the external sensor devices 28 detect the client systems 20 and the performing devices 40 traveling along a support surface (i.e., as vehicles), where the sensor devices 26, 28 are configured to detect the velocity, including any variations in velocity, at which the client systems 20 and the performing devices 40 travel along the support surface. In addition, when the internal sensor devices 26 and the external sensor devices 28 are detecting the input of data into the client systems 20, the internal sensor devices 26 are configured to detect the speed or amount of time the data is input into the client systems 20.

At step 204, the server systems 10 calculate the expected machine based behavior for the activity measured by the sensor devices 26, 28 of the client systems 20. The behavior analysis module 18 of the server systems 10 may calculate the expected machine based behavior for the activity measured by the sensor devices 26, 28 of the client systems 20 in multiple ways. In one embodiment of the present invention, the server systems 10 may have knowledge of the system or entity completing the activity and/or knowledge of the activity being completed. The data of the system or entity and the data of the activity being completed may both be stored in the database 17. The sever systems 10 may access the database 17 to acquire this data and information to calculate how a machine would perform or behave in completing the same measured activity. For example, when calculating the path a self-driving vehicle (e.g. a vehicle controlled by a machine/computer) would take between two points, the server systems 10 utilize the behavior analysis module 18 to calculate the expected path of the self-driving vehicle along the road.

In another embodiment of the present invention, the behavior analysis module 18 would take the measured data points from the measured behavior or performance of the entity completing the activity and apply a linear, curve, or function model utilizing the modeling methods of, but not limited to, linear regression, a polynomial function, etc. In other words, the behavior analysis module 18 would apply a known method of calculating a mathematical model to a set of data points, where the mathematical model represents the data points from the measured behavior or performance of the entity completing the activity.

Once the server systems 10 calculate the expected machine based behavior for the activity, at step 206, the server systems 10 calculate the deviation or variance between the expected machine behavior and the behavior measured by the sensor devices 26, 28 of the client systems 20. Thus, utilizing behavior analysis module 18, the server systems 10 compare the measured behavior and performance of the entity (e.g., client systems 20, performance devices 40, etc.) performing/completing the activity to the calculated expected behavior of a machine performing or completing the activity with one of the entities. In comparing the two data sets, the behavior analysis module 18 calculates a variance or standard deviation between the measured behavior and performance of the entity performing/completing the activity and the calculated expected behavior of a machine performing or completing the activity with one of the entities.

For example, when the activity being completed is the path a vehicle travels between two points, and the behavior analysis module 18 applied a curve fit line representing the calculated expected behavior of a machine performing/completing the activity to the data points of the measured behavior and performance of the entity performing/completing the activity, the behavior analysis module 18 assesses how close the curve fit line fits the measured data points. In other words, the behavior analysis module 18 of the server systems 10 measures the distance from the curve fit line of each of the data points, and, from those measurements, calculates the variance, and thus the standard deviation, of the data points from the measured behavior and performance of the entity performing/completing the activity with respect to the line representing the calculated expected behavior of a machine performing/completing the activity. The larger the variance or standard deviation, the greater the difference between the measured behavior and performance of the entity performing/completing the activity and the calculated expected behavior and performance of a machine performing/completing the activity.

In another present invention embodiment, the server systems 10 may utilize the behavior analysis module 18 to identify patterns in the data set of the measured behavior and performance of the entity performing/completing the activity. Typically, humans are unable to repeatedly complete the same activity in exactly the same manner. Conversely, machines and computers routinely complete the same activity in exactly the same manner. Thus, when the performance and behavior of machines and computers are measured, the measurements may reveal a pattern or set of patterns for the completion of the activity. However, human performance and behavior is more random and includes more variation. Thus, if, when utilizing the behavior analysis module 18, the server systems 10 detect a pattern or set of patterns in the measured behavior or performance, the measured behavior or performance is more likely to be controlled or implemented by a machine than a human.

At step 208, the server systems 10 utilize the actor determination module 19 to compare the calculated variance to a predetermined variance value N. In one present invention embodiment, the predetermined variance value N may be approximately 2-3%±1%. The predetermined variance value N may be set by a user, or may be set by the server systems 10 based on the activity being performed and measured. If the calculated variance N exceeds the predetermined variance value N, then the actor determination module 19 determines at step 210 that the actor controlling the entity being measured is a human. In other words, if the calculated variance N exceeds the predetermined variance value of N, then the actor determination module 19 determines that the measured behavior is human behavior. If the calculated variance N, however, does not exceed the predetermined variance value of N, then the actor determination module 19 determines at step 212 that the actor controlling the entity being measured is a machine. In other words, if the calculated variance N does not exceed the predetermined variance value of N, then the actor determination module 19 determines that the measured behavior is machine behavior.

As the calculated variance value increases, the confidence level of the actor determination module 19 increases that the measured behavior is that of a human. It then follows that as the calculated variance value increases, the confidence level of the actor determination module 19 decreases that the measured behavior is that of a machine. Conversely, as the calculated variance value decrease, the confidence level of the actor determination module 19 decreases that the measured behavior is that of a human. It further follows that as the calculated variance value decreases, the confidence level of the actor determination module 19 increases that the measured behavior is that of a machine. Similarly, in one present invention embodiment, an increase of the standard deviation, or higher values of the standard deviation, is correlated with an increase in the confidence level of the actor determination module 19 that the measured behavior is that of a human, and a decrease in the confidence level of the actor determination module 19 that the measured behavior is that of a machine. Conversely, a decrease of the standard deviation, or smaller values of the standard deviation, is correlated with a decrease in the confidence level of the actor determination module 19 that the measured behavior is that of a human, and an increase in the confidence level of the actor determination module 19 that the measured behavior is that of a machine.

After the actor determination module 19 makes a determination that the measured behavior is human behavior at step 210 or a determination that the measured behavior is machine behavior at step 212, the server systems 10, at step 214, send the determination to the client systems 20 to inform the client systems 20 as to whether the entity performing the activity is being controlled by a machine or a human. The client systems 20 may utilize the determination to take appropriate action. For example, when the client systems 20 and the performance devices 40 are vehicles, and the activity being monitored is that of the performance devices 40 traveling along the same road on which the client systems 20 are traveling, the determination as to whether or not the performance devices 40 are controlled by machines or are controlled by humans may determine the actions taken by the client systems 20. When the client systems 20 are self-driving vehicles, and the determination is made that the performance devices 40 are also self-driving vehicles (i.e., controlled by machines and exerting machine behavior), the client systems 20 can follow the performance devices 40 from closer distance and at a faster speed than when the performance devices 40 are not self-driving vehicles (i.e., controlled by humans and exerting human behavior).

In another example, when the client systems 20 are a security system set up for access to data, and the sensor devices 26, 28 are configured to measure and monitor the input of data (i.e., passwords) into an interface, the determination as to whether a machine or a human is entering the data may determine how the client systems 20 respond or react to the received data. Because humans make errors when entering data, if a wrong password is entered, and the client systems 20 are notified that the password is being entered by a human, the client systems 20 may still provide the human additional chances to enter the correct password. If a wrong password is entered, and the client systems 20 are notified that the password is being entered by a machine, the client systems 20 may make the determination that the attempted access of the security system is malicious and may lock the machine out of the security system while simultaneously blocking the internet protocol (IP) address of the entity attempting to access the security system.

In yet another example, when the client systems 20 are a mobile device configured to receive and allow human interactions, and the sensor devices 26, 28 are configured to measure and monitor the interactions with the mobile device (i.e., swiping of the touch screen, depressing of the buttons, etc.), the determination as to whether a machine or a human is attempting to interact with the mobile device may determine how the client systems 20 respond or react to the interactions. If the client systems 20 receive interactions from a user, and the client systems 20 are notified that the interactions are is being generated by a human, the client systems 20 will continue to allow and enable the human user to interact with the client systems 20. However, if the client systems 20 are notified that the interactions received from a user are being generated by a machine, the client systems 20 may make the determination that the interactions from the machine user may be malicious or unauthorized and may lock the machine user out of the mobile device.

Figure 3A:
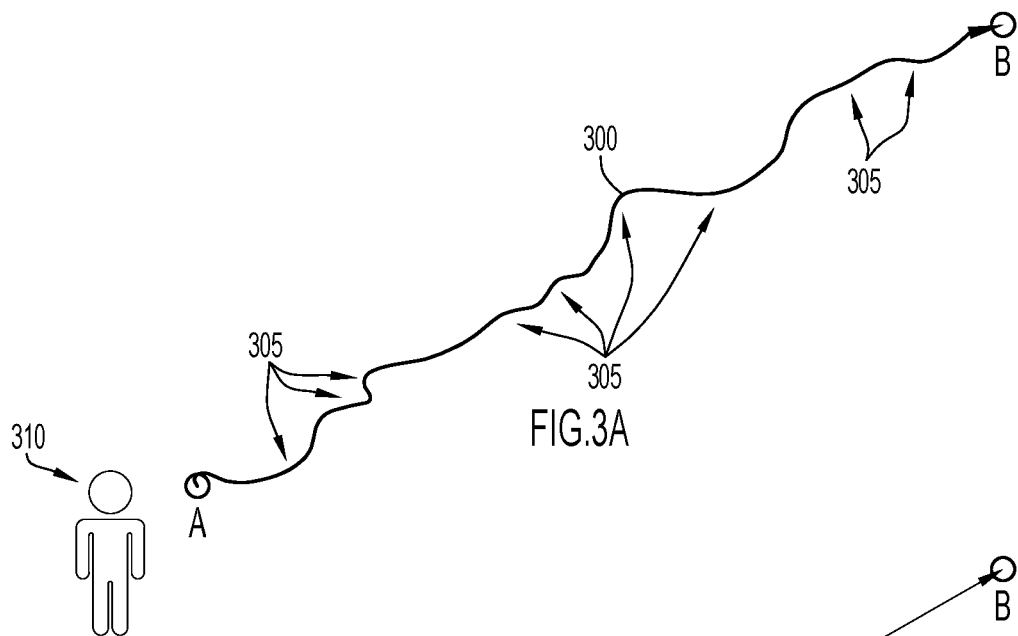
FIG. 3A depicts an example of a path taken by a vehicle traveling between two points, the vehicle receiving control inputs from a human, according to one present invention embodiment.
Figure 3B:
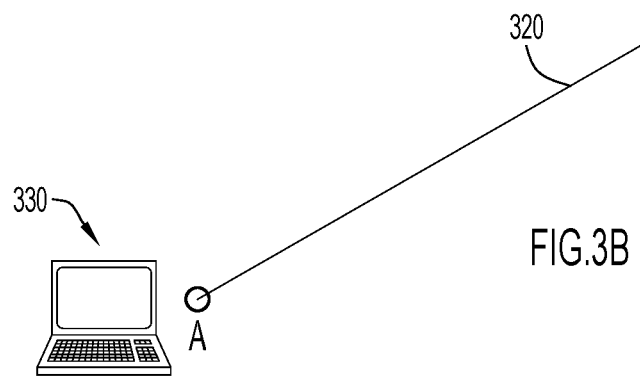
FIG. 3B depicts an example of a path taken by a vehicle traveling between two points, the vehicle receiving control inputs from a machine, according to one present invention embodiment.
Figure 3C:
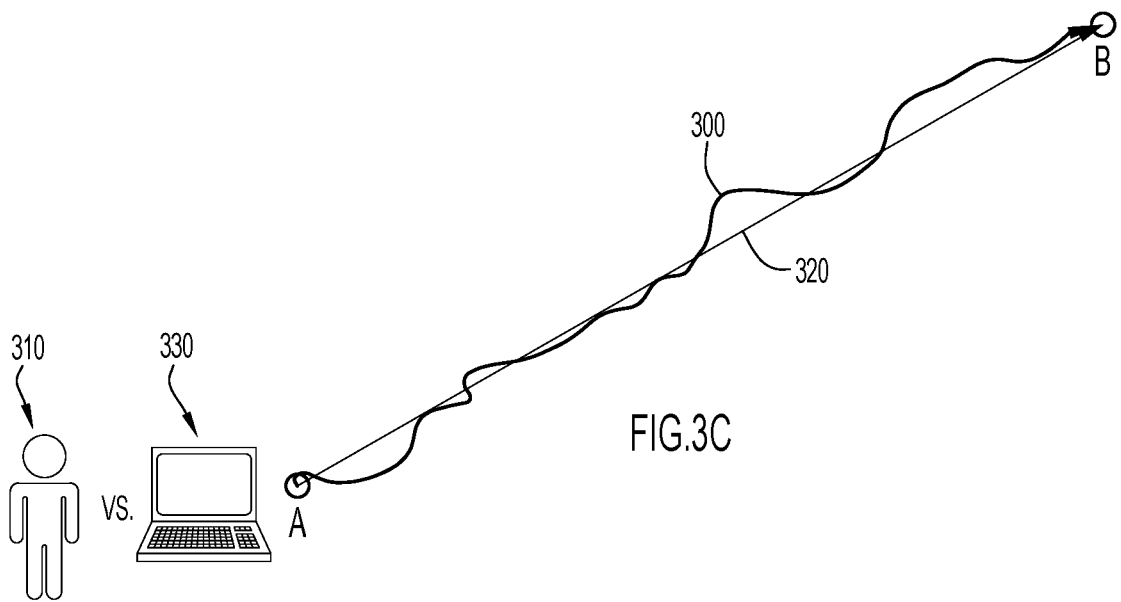
FIG. 3C depicts a comparison of the path taken by the vehicle receiving control inputs from the human illustrated in FIG. 3A with the path taken by the vehicle receiving control inputs from the machine illustrated in FIG. 3B.

Turning to FIGS. 3A, 3B, 3C, illustrated is an example present invention embodiment, where the client systems 20 are utilizing the sensor devices 26, 28 to measure the path the performance device 40 travels between a first point A and a second point B. FIG. 3A illustrates the plot of the path 300 taken by the performance device 40 when the performance device 40 receives inputs from a human 310 (i.e., driven by a human 310). The path 300 is a line connecting all of the measured data points acquired by the sensor devices 26, 28 of the client systems 20 in monitoring the positioning of the performance device 40 as it travels between the first point A and the second point B. As illustrated in FIG. 3A, the path 300 is not a straight line between the first point A and the second point B, and the path 300 includes a series of undulations, curves, and/or deviations 305. The deviations 305 of the path 300 of the performance device 40 may represent the slight deviations of the performance device 40 within a lane of a road between first point A and second point B, which are a result of rotations of the steering wheel by the human 310 of the performance device 40 (i.e., drifting back and forth within a lane).

FIG. 3B may either illustrate the path 320 taken by the performance device 40 when the performance device 40 receives inputs from a machine 330 or the calculated expected path 320 taken by the performance device 40 when the performance device 40 is receiving inputs from a machine 330. As previously explained, the calculated expected path 320 is calculated by the behavior analysis module 18 of the server systems 10 when the server systems 10 receive measured data points of the performance device 40 from the client systems 20. As previously explained, the behavior analysis module 18 of the server systems 10 may calculate the expected machine based path by accessing knowledge of the performance device 40 and the path between first point A and second point B from database 17 when that information is stored in database 17. The behavior analysis module 18 of the server systems 10 may also calculate the expected machine based path 320 by plotting a best fit line to the data points or line representing path 300, which is based on the data points measured by the sensor devices 26, 28 of the client systems 20.

FIG. 3C illustrates the comparison of the measured path 310 depicted in FIG. 3A and the calculated expected machine path 320 depicted in FIG. 3B, where the measured path 310 is overlaid onto the calculated expected machine path 320. As illustrated in FIG. 3C, the behavior analysis module 18 of the server systems 10 would calculate or determine that there is a large variance between the measured path 300 and the calculated expected machine path 320. As further illustrated in FIG. 3C, the behavior analysis module 18 of the server systems 10 can further determine that the deviations 305 of the measured path 300 from the calculated expected machine path 320 do not represent or contain any pattern with respect to the calculated expected machine path 320. From these determinations and calculations, the behavior analysis module 18 and the actor determination module 19 would make the determination that a human provided or generated the inputs to the performance device 40 as the performance device 40 traveled between first point A and second point B.

Figure 4:
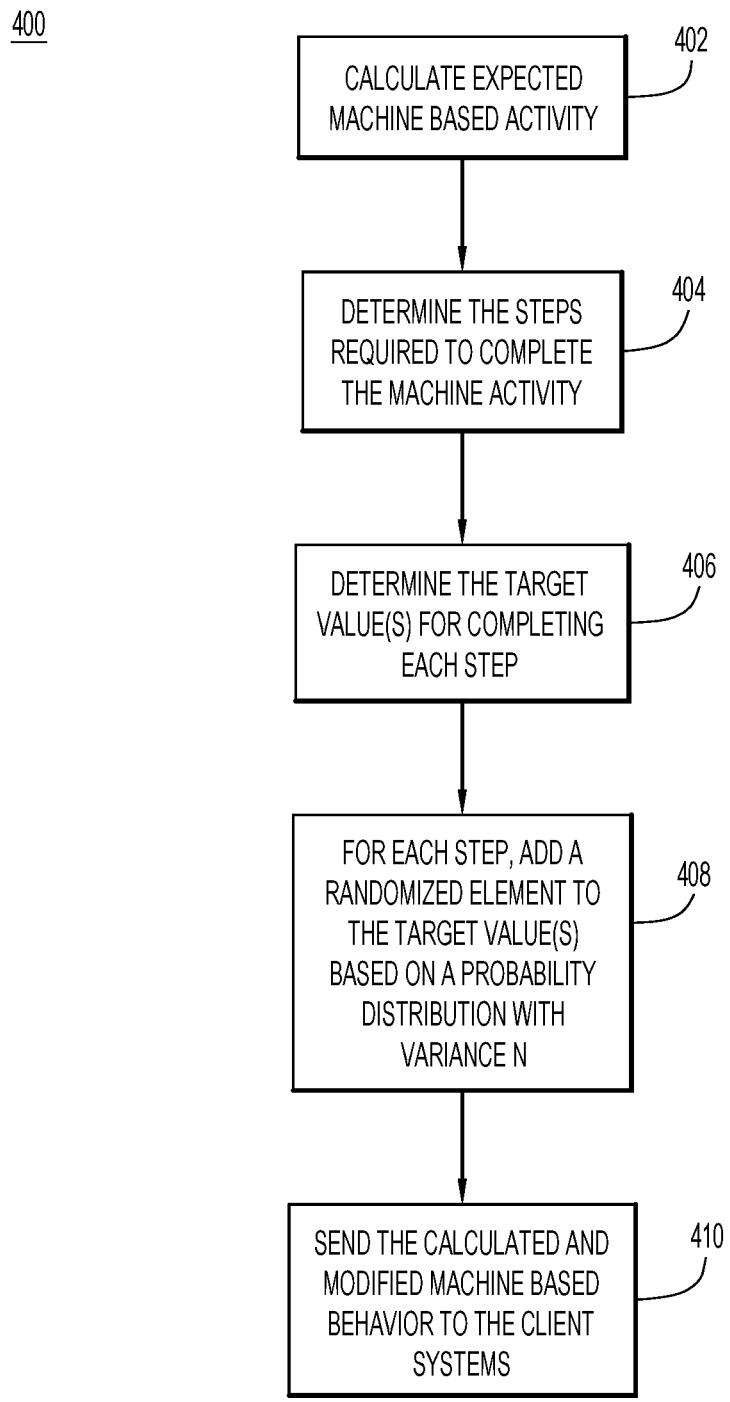
FIG. 4 is a procedural flowchart of a machine simulating human behavior of an entity performing an activity, according to one present invention embodiment.

With reference now to FIG. 4, procedural flow chart 400 depicts operations (e.g., of the behavior analysis module 18 and the actor determination module 19 of the server systems 10, and the activity performance module of the client systems 20) for generating machine behavior for an entity, where the generated machine behavior mimics or simulates human behavior of an entity. Machine generated behavior of an entity that simulates human generated behavior of the same or similar entity may be utilized to give the impression that a machine controlled entity is being controlled by a human. Machine generated behavior of an entity that simulates human generated behavior of the same or similar entity may be utilized to provide comfort to humans operating around and interacting with the entity.

Initially, at step 402, the server systems 10 may utilize the behavior analysis module 18 to calculate an expected machine based behavior for a specific activity. As previously explained, the server systems 10 may be able to calculate expected machine based behavior for a specific activity in multiple ways. In one present invention embodiment, the server systems 10 may have knowledge of the system or entity that will be completing the activity, as well as knowledge of the activity to be completed. The data of the system or entity and the data of the activity to be completed may both be stored in the database 17, which the server systems 10 may access to acquire the data. In another embodiment of the present invention, the behavior analysis module 18 may calculate the expected machine behavior by applying a linear, curve, or function model to previously received data points that were measured by the sensor devices 26, 28 of the client systems 20 of an entity completing the same or similar activity.

At step 404, the behavior analysis module 18 of the server systems 10 determine the steps that are required to complete the machine behavior. Some activities may require a larger amount of steps that must be completed when compared to other activities. For example, when the activity to be completed is the entry of a password into a security system to access data, the only steps to be completed are the entry of each character of the password. In another example, however, when the activity to be completed is a self-driving vehicle traveling between a first point and a second point, a large number of steps must be completed, such as, but not limited to, acceleration events, deceleration events, braking events, detecting objections, turning events, etc.

At step 406, the behavior analysis module 18 of the server systems 10 determine the target value(s) for completing each required step of the activity. Depending on the activity being completed, the target value(s) for completing each required step may be, but are not limited to, positioning along a path, velocity/speed, distance along a path, temperature, time, altitude, entry into a data field, etc. For some steps, only one target value may be required for completing each step of the activity. Other steps may include multiple target values that required for completing each step of the activity. For example, when the activity to be completed is the entry of a password into a security system to access data, target values for completing a step may be the character to be entered for a character position in a password and the timing of the entry of the character with respect to the entry of the previous character of the password. In another example, however, when the activity to be completed is a self-driving vehicle traveling between a first point and a second point, target values for completing a step may be the positioning of the self-driving vehicle along a road or the velocity of the self-driving vehicle on a particular road.

At step 408, the behavior analysis module 18 of the server systems 10 adds a randomized element(s) to the target value(s) based on a probability distribution with a variance value of N for each step required to complete the activity. By adding randomized element(s) to the target value(s), the calculated expected machine based behavior for the activity is modified. The behavior analysis module 18 of the server systems 10 may acquire the variance value N from the actor determination module 19 of the server systems 10, where the variance value N is the threshold value of the variance used to determine if measured behavior of an entity is being controlled by a machine or a human. As previously explained, when the calculated variance between the calculated machine based behavior or performance of the entity and the measured behavior or performance of the entity is greater than the variance value N, the actor determination module 19 determines that the measured behavior or performance of the entity is generated by a human. Thus, when the behavior analysis module 18 is inputting the randomized element(s) into the target value(s) for each step, where the randomized element(s) are based on the probability distribution with variance value N, the behavior analysis module 18 is modifying the calculated expected machine based behavior to a calculated and modified machine based behavior with a variance between the calculated expected machine based behavior and the calculated and modified machine based behavior. Adding the randomized element(s) for the target value(s) of each step makes the variance between the calculated expected machine based behavior and the calculated and modified machine based behavior equal to or greater than the variance value N, which gives the calculated and modified machine based behavior for the activity the appearance of human based behavior.

Once the behavior analysis module 18 of the server systems 10 creates the calculated and modified machine based behavior for the entity, the server systems 10, at step 410, send the calculated and modified machine based behavior to the client systems 20. The client systems 20 may utilize the activity performance module 24 to complete or perform the activity in the manner intended by the calculated and modified machine based behavior. In another embodiment, the server systems 10 may send the calculated and modified machine based behavior to the performing devices 40 so that the performing devices 40 may utilize the activity performance module 42 to complete or perform the activity in the manner intended by the calculated and modified machine based behavior. The server systems 10 may send the calculated and modified machine based behavior to the client systems 20 and/or the performance devices 40 via network 30.

For example, when the client systems 20 are self-driving vehicles, and the activity to be completed is traveling between the first point A and the second point B illustrated in FIGS. 3A, 3B, and 3C, the process 400 of calculating the modified machine based behavior adds variation into the path taken by the self-driving vehicle. As illustrated in FIG. 3B, the calculated machine based path 320 of a self-driving car traveling from first point A to second point B is a straight line. However, the process 400 would calculate a modified machine based behavior that add variance to the path 320, where the self-driving vehicle would take a path between first point A and second point B that contains undulations and deviations 305, similar to that of the path 300 illustrated in FIG. 3A. Other variations of the calculated machine based path 320 could include variations in velocity of the self-driving vehicle, because when traveling between two locations, a machine would not vary the speed of the self-driving vehicle as much as a human would vary the speed of a vehicle.

In another example, when the client systems 20 are a security system set up to receive a password for access to data, the process 400 of calculating the modified machine based behavior adds variation into the entry of the password to give the appearance as if a person was attempting to type in a password. The calculated machine based behavior of entering the password may enter all of the characters of the password as fast as possible, and with uniform timing between the entries of each of the characters of the password. For this example, however, the process 400 would calculate a modified machine based behavior that adds variance to the password entry. Thus, the modified machine based behavior would vary the timing between the entries of each password character. The modified machine based behavior would also enter the password at a slower pace than that of the calculated machine based behavior. In addition, the modified machine based behavior may even enter a wrong character for the password, to then delete the wrong character and reenter the correct character. These variations caused by the modified machine based behavior would give the appearance to a system or entity monitoring the entry of the password for the security system that a human is entering the password.

In yet another example, when the client systems 20 are a mobile device configured to receive and allow human interactions (i.e., swiping of the touch screen, depressing of the buttons, etc.), the process 400 of calculating the modified machine based behavior adds variation into the interactions with the mobile device to give the appearance as if a person was interacting with the mobile device. The calculated machine based behavior for interacting with the mobile device may cause the touch screen of the mobile device to be swiped in one direction at a certain speed or velocity not typically exerted by a human interacting with the mobile device. The modified machine based behavior may cause the touch screen to be swiped as a slower speed when compared with that of the calculated machine based behavior. In addition, the modified machine based behavior may cause the touch screen to be swiped in a varied manner that is not a uniform motion in one direction. The modified machine based behavior may even cause the touch screen may even be partially swiped toward one direction, where the swipe action may be canceled or stopped before fully completing a swipe action and then recommenced to complete the full swipe action. These variations caused by the modified machine based behavior would give the appearance to a system or entity monitoring the interactions with the mobile devices that a human is interacting with the mobile devices.

Figure 5:
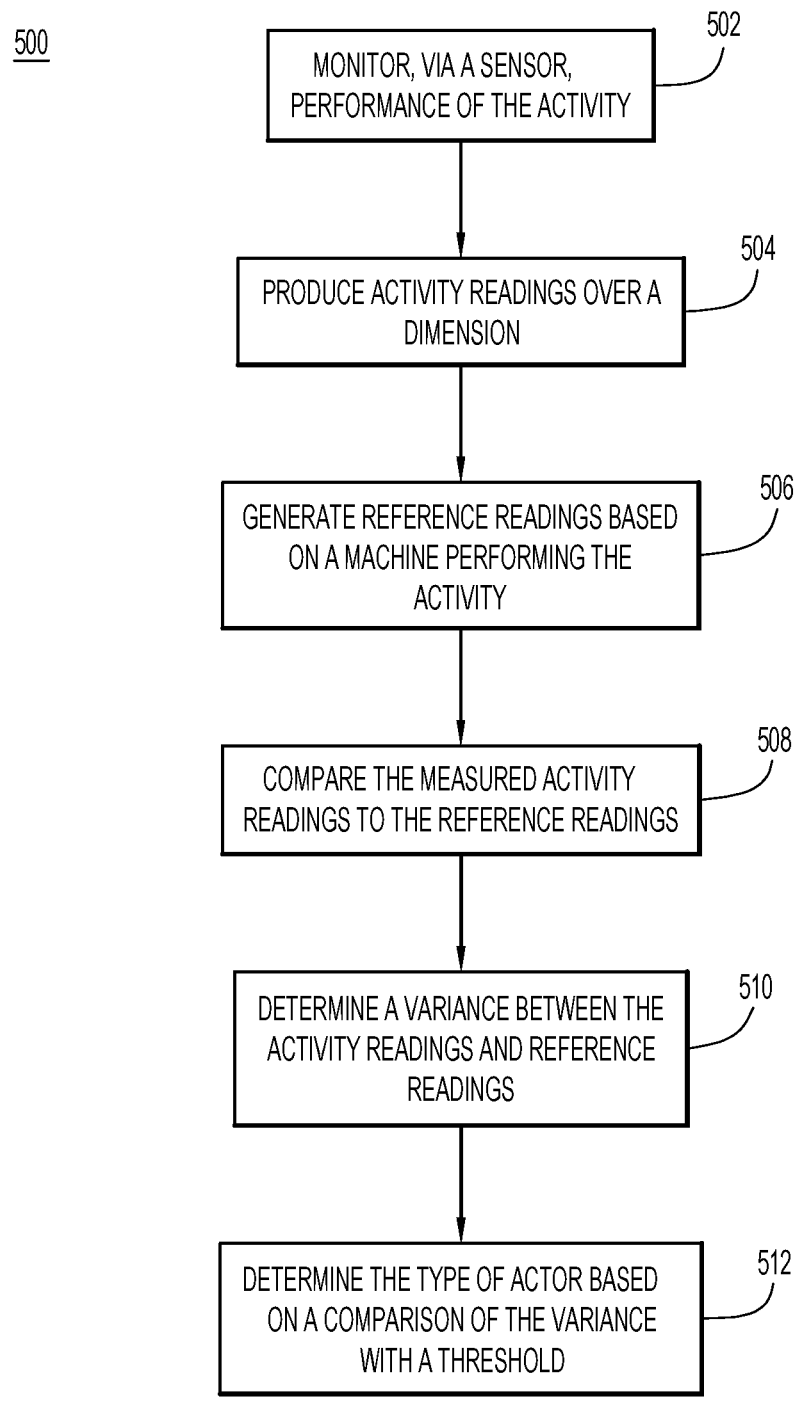
FIG. 5 is a procedural flow chart of determining a type of actor performing an activity according to a present invention embodiment.

With reference now to FIG. 5, procedural flowchart 500 depicts operations (e.g., of behavior collection module 22, behavior analysis module 18, and actor determination module 19) of the server systems 10 and the client systems 20 for determining a type of actor performing an activity. At step

502, the client systems 20 utilize the internal sensor devices 26 and/or the external sensor devices 28 to monitor an activity being completed or performed by the client systems 20 and/or the performance devices 40. The behavior collection module 22 of the client systems 20 utilize the sensor devices 26, 28 to monitor and observe the behavior of the client systems 20 and the performance devices 40 as they complete and perform an activity. At step 504, the behavior collection module 22 of the client systems 20 may compile the data received and recorded by the sensor devices 26, 28 to produce a series of activity readings over a dimension. The readings may represent the behavior of the entity (e.g., client systems 20, performance devices 40) over a dimension (e.g., velocity, positioning, temperature, etc.). The client systems 20 may send, via network 30, the activity readings to the server systems 10.

At step 506, the behavior analysis module 18 of the server systems 10 generates reference readings based on a machine performing the activity measured and monitored by the client systems 20. The reference readings based on a machine performing the activity are the calculated machine based behavior or performance of the activity. As previously explained, the server systems 10 may have knowledge of the system or entity that completed the activity, as well as knowledge of the activity that was completed, and the behavior analysis module 18 may utilize this knowledge to calculate an expected machine based behavior or performance of the activity. In another embodiment of the present invention, the behavior analysis module 18 may calculate the expected machine behavior by applying a linear, curve, or function model to the recently received activity readings that were measured by the sensor devices 26, 28 of the client systems 20.

At step 508, the behavior analysis module 18 of the server systems 10 compares the measured activity readings to the reference readings. Then, at step 510, the behavior analysis module 18 determines a variance between the activity readings and the reference readings. In comparing the two readings, the behavior analysis module 18 calculates a variance or standard deviation between the measured activity readings and the reference readings. After determining the variance or standard deviation, the server systems 10, at step 512, may utilize the actor determination module 19 to determine the type of actor by comparing the calculated variance with a threshold. In the event the calculated variance exceeds the threshold, the actor determination module 19 would make the determination that the client systems 20 were monitoring the performance of a human completing the activity. In the event that the calculated variance does not exceed the threshold, the actor determination module 19 would make the determination that the client systems 20 were monitoring the performance of a machine completing the activity. As previously explained, the threshold may be a predetermined value, or may be calculated by the actor determination module based on the knowledge of the activity being performed. In some embodiments, the threshold may vary between different activities.

The techniques provided herein have a number of advantages. As one example, the techniques enable a system or user to determine the type of actor controlling another entity performing an activity by merely monitoring or observing the behavior of the entity. By providing systems and devices with determinations of the type of actor performing an activity, the systems and devices can provide enhanced user interactions, while still safely operating with and around humans and other devices. In addition, the techniques also provide an increased level of security to systems and devices, especially in detecting malicious attempts to access devices or data systems.

Moreover, the techniques provided herein also provide an automated system that may be configured to act similar to human behavior. Humans often fear the unknown, and interacting with some automated systems (i.e., self-driving vehicle) may incite fear into humans. Automated systems that simulate human behavior, however, enable an automated system to perform activities and interact with humans without inciting that fear. This ability may enable the quicker and smoother implementation of automated systems into everyday lives without being noticed by those interacting with the automated systems.

It will be appreciated that the embodiments described above and illustrated in the drawings represent only a few of the many ways of implementing embodiments for determining a type of actor performing an activity.

The environment of the present invention embodiments may include any number of computer or other processing systems (e.g., client or end-user systems, server systems, performance devices, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, behavior analysis module 18, actor determination module 19, behavior collection module 22, activity performance modules 24, 42, etc.). These systems may include any types of monitors and input devices (e.g., keyboard, mouse, voice recognition, etc.) to enter and/or view information.

It is to be understood that the software (e.g., behavior analysis module 18, actor determination module 19, behavior collection module 22, activity performance modules 24, 42, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., behavior analysis module 18, actor determination module 19, behavior collection module 22, activity performance modules 24, 42) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., sensor device readings, calculated expected machine behavior and performance, activity profiles, variance calculations, threshold values, etc.). The database system may be implemented by any number of any conventional or other databases, data stores or storage structures (e.g., files, databases, data structures, data or other repositories, etc.) to store information (e.g., sensor device readings, calculated expected machine behavior and performance, activity profiles, variance calculations, threshold values, etc.). The database system may be included within or coupled to the server and/or client systems. The database systems and/or storage structures may be remote from or local to the computer or other processing systems, and may store any desired data (e.g., sensor device readings, calculated expected machine behavior and performance, activity profiles, variance calculations, threshold values, etc.).

The present invention embodiments may employ any number of any type of user interface (e.g., Graphical User Interface (GUI), command-line, prompt, etc.) for obtaining or providing information (e.g., sensor data, modeling data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining a type of actor performing an activity comprising:
   monitoring a device performing the activity in response to controls from the actor to produce activity readings over a dimension, wherein the device includes one of a vehicle monitored by an external sensor to perform the activity of travelling along a path and a computer system monitored by an internal sensor to perform the activity of accessing data in response to input entered by the actor, and wherein the activity readings represent behavior of the device in response to control by the actor;
   comparing the activity readings to reference readings generated based on a machine controlling the device for performing the activity to determine a variance, including a standard deviation and correlated with a confidence level, between the activity readings and reference readings;
   determining the type of actor controlling the device based on a comparison of the variance with a threshold;
   in response to determining the actor is a machine controlling the vehicle, operating the vehicle at a speed along the path with less variations relative to a human actor; and
   in response to determining the actor is a machine controlling the computer system, locking the computer system to prevent unauthorized access.

2. The method of claim 1, wherein the type of actor includes one of a machine and an organism.

3. The method of claim 1, wherein determining the variance includes:
   analyzing the activity and reference readings to define patterns.

4. The method of claim 3, further comprising: producing the confidence level for the determined type of actor.

5. The method of claim 1, further comprising:
adding randomized elements to the reference readings based on a probability distribution to produce simulated readings of the activity performed by an organism; and
utilizing the simulated readings to direct a machine to control the device to perform the activity in a manner simulating control of the device by the organism.

6. The method of claim 1, wherein the dimension includes one of time, a distance, and a travel path.

7. A processing system for determining a type of actor performing an activity comprising:
a processor configured to:
monitor a device performing the activity in response to controls from the actor to produce activity readings over a dimension, wherein the device includes one of a vehicle monitored by an external sensor to perform the activity of travelling along a path and a computer system monitored by an internal sensor to perform the activity of accessing data in response to input entered by the actor, and wherein the activity readings represent behavior of the device in response to control by the actor;
compare the activity readings to reference readings generated based on a machine controlling the device for performing the activity to determine a variance, including a standard deviation and correlated with a confidence level, between the activity readings and reference readings;
determine the type of actor controlling the device based on a comparison of the variance with a threshold;
in response to determining the actor is a machine controlling the vehicle, operate the vehicle at a speed along the path with less variations relative to a human actor; and
in response to determining the actor is a machine controlling the computer system, lock the computer system to prevent unauthorized access.

8. The processing system of claim 7, wherein the type of actor includes one of a machine and an organism.

9. The processing system of claim 7, wherein in determining the variance, the processor is further configured to:
analyze the activity and reference readings to define patterns.

10. The processing system of claim 9, wherein the processor is further configured to: produce the confidence level for the determined type of actor.

11. The processing system of claim 7, wherein the processor is further configured to:
add randomized elements to the reference readings based on a probability distribution to produce simulated readings of the activity performed by an organism; and
utilize the simulated readings to direct a machine to control the device to perform the activity in a manner simulating control of the device by the organism.

12. The processing system of claim 7, wherein the dimension includes one of time, a distance, and a travel path.

13. A computer program product for determining a type of actor performing an activity, the computer program product comprising one or more computer readable storage media collectively having computer readable program code embodied therewith, the computer readable program code executable by at least one processor to cause the at least one processor to:
monitor a device performing the activity in response to controls from the actor to produce activity readings over a dimension, wherein the device includes one of a vehicle monitored by an external sensor to perform the activity of travelling along a path and a computer system monitored by an internal sensor to perform the activity of accessing data in response to input entered by the actor, and wherein the activity readings represent behavior of the device in response to control by the actor;
compare the activity readings to reference readings generated based on a machine controlling the device for performing the activity to determine a variance, including a standard deviation and correlated with a confidence level, between the activity readings and reference readings;
determine the type of actor controlling the device based on a comparison of the variance with a threshold;
in response to determining the actor is a machine controlling the vehicle, operate the vehicle at a speed along the path with less variations relative to a human actor; and
in response to determining the actor is a machine controlling the computer system, lock the computer system to prevent unauthorized access.

14. The computer program product of claim 13, wherein the type of actor includes one of a machine and an organism.

15. The computer program product of claim 13, wherein in determining the variance, the computer readable program code is further configured to cause the at least one processor to:
analyze the activity and reference readings to define patterns.

16. The computer program product of claim 15, wherein the computer readable program code is further configured to cause the at least one processor to:
produce the confidence level for the determined type of actor.

17. The computer program product of claim 13, wherein the computer readable program code is further configured to cause the at least one processor to:
add randomized elements to the reference readings based on a probability distribution to produce simulated readings of the activity performed by an organism; and
utilize the simulated readings to direct a machine to control the device to perform the activity in a manner simulating control of the device by the organism.

18. The computer program product of claim 13, wherein the dimension includes one of time, a distance, and a travel path.

* * * * *